United States Patent [19]

Lapeyre

[11] 4,414,754
[45] Nov. 15, 1983

[54] HIGH RESOLUTION COMPASS CARD POSITION DECODER

[75] Inventor: James M. Lapeyre, New Orleans, La.

[73] Assignee: The Laitram Corporation, New Orleans, La.

[21] Appl. No.: 354,885

[22] Filed: Mar. 4, 1982

[51] Int. Cl.³ .............................................. G01C 17/28
[52] U.S. Cl. ................................. 33/363 K; 33/355 R; 33/125 C
[58] Field of Search ................... 33/363 K, 356, 362, 33/352, 360, 355 R, 125 C; 324/253, 254, 251

[56] References Cited

U.S. PATENT DOCUMENTS

| | | | |
|---|---|---|---|
| 3,480,788 | 11/1969 | Barbieri et al. | 33/363 K |
| 3,772,502 | 11/1973 | Fowler | 33/363 K |
| 4,109,389 | 8/1978 | Balcom et al. | 33/363 K |
| 4,117,602 | 10/1978 | Lapeyre | 33/363 K |

*Primary Examiner*—Willis Little
*Attorney, Agent, or Firm*—Weingarten, Schurgin, Gagnebin & Hayes

[57] ABSTRACT

The angular position of a compass card or like rotary encoder disk includes the utilization of an optical pickoff system in which the accuracy associated with a digitally encoded disk is enhanced through the utilization of a secondary analog optical pickoff system in which the outer periphery or border of the disk carrying the digital code is provided with a series of skewed lines running at an angle to the radius of the disk. A mask having a narrow slot is located to one side of the disk along the radius of the disk. A light source is positioned on the other side of the disk, and a linear array of detectors is positioned above the slot. The use of the skewed lines and slot amplifies the motion of the rotary encoder disk such that fine angular orientation may be detected by virtue of the position along the length of the slot of a line within the slot aperture.

29 Claims, 6 Drawing Figures

HIGH RESOLUTION COMPASS CARD POSITION DECODER

FIELD OF INVENTION

This invention relates to the sensing of the angular position of a compass card or the like, and more particularly to a dual optical pickoff system in which the accuracy of the primary optical pickoff system is enhanced by virtue of the secondary optical pickoff system.

BACKGROUND OF THE INVENTION

As disclosed in U.S. Pat. Nos. 3,888,016, 3,772,503 and 3,927,474, incorporated herein by reference, digital compasses have been provided in which the angular orientation of the compass card is determined by a primary optical pickoff which involves an encoder disk driven by the magnetic sensing element of the compass. This encoder disk is provided with digital encoder markings or a digital code that in general results in the establishing of the angular position of the encoder disk and thus the angular position of the magnetic element of the compass. The accuracy to which position can be ascertained with a digitally encoded compass is on the order of 2° (e.g. ±1°).

Extremely accurate compasses are required for some seismic prospecting applications in which it is critical to determine the direction of the seismic streamer. Moreover, the use of multiple streamers at different orientations permits location of a sonar target by triangulation, doppler shift or other techniques. Instantaneous direction readout to a high degree of accuracy is especially important in towed streamer applications for real time processing of sonar data.

It will be appreciated that the accuracy of the digital encoding is directly related to the size and spacing of the encoder marks on the encoder disk which represent the limit of the angular resolution of the compass or encoder disk. Side by side light and dark areas at the periphery of the disk in general define the limit of accuracy of the optical pickoff. While for most applications this accuracy is sufficient, in other applications measuring the angular position of the compass card to one one-hundredth of a degree is often desired.

SUMMARY OF THE INVENTION

In order to obtain increased accuracy for digital compasses and the like, a secondary analog optical pickoff system is provided such that while gross angular position is determined by the primary optical pickoff system, fine angular position is determined by a secondary optical pickoff system. The secondary optical pickoff system includes skewed radially running lines on a peripheral extension or border of the digital encoder compass card, with the lines forming an outer pattern. For linearity, the outer pattern may be in the form of curved lines running from an inner circle on the disk to an outer circle, with the circles forming the aformentioned border. Each line runs from a point on the inner circle representing one angular position to a point on the outer circle representing a shift in the angular position corresponding to the limit of accuracy of the digitally encoded primary optical pickoff system. Thus, for instance, if the primary optical pickoff system has an accuracy of 2°, then a line on the secondary optical pickoff system runs from one position at the inner circle to a position on the outer circle shifted angularly by 2°.

The secondary optical pickoff system includes a mask with a slit or slot which is relatively narrow. The length of the slot corresponds to the radial distance between the aforementioned inner and outer circles and is positioned such that the slot is oriented above the disk along the same radius as that along which the primary optical pickoff is made. The secondary optical pickoff system is provided with a light source to one side of the encoder disk and a linear array of detectors located above the slot along the radius of the slit. In one embodiment the array may have as many as 1,000 detectors to the inch.

In operation, the gross angular position of the encoder disk is established by the conventional digital optical pickoff system. The position of the disk is further refined by the position of the line of the secondary optical pickoff system within the aforementioned slot. Thus, for instance, if the gross reading from the primary optical pickoff system is 73° and the line lies one quarter way up the slot, then assuming a 2° accuracy for the primary system, the secondary reading is added to the primary reading such that the angular position of the encoder disk is 73° plus 0.50° or 73.50°.

By virtue of the utilization of the slot and the skewed secondary lines to form an outer pattern, the angular position of the encoder disk is magnified and can be read to an accuracy exceeding one minute of arc and often as high as 1/100°.

It will be appreciated that the secondary lines are oriented at an angle to the radius of the disk. As such, there are a large number of secondary lines, the number in general being determined by the angular accuracy of the primary optical pickoff system. Thus, for instance, if the primary optical system has an angular accuracy of 2°, the number of lines required for 360° encoding is 360° divided by 2° or 180 lines.

In one embodiment the skewed lines are straight lines running from the inner circle to the outer circle. This produces a non-linear measurement in that the position of the line appearing within the slot is non-linearly related to the angular position of the encoder disk. A linear relationship may be established by providing a curved line from the inner circle to the outer circle in which the curve is a spiral curve in which $R = R_1 + K\theta$, where R is the radius of a point on the curve at $\theta$ and in which $R_1$ is the radius of the inner circle from which the line emanates. Here $\theta = 0$ for the start of the line and runs up to the angular limit of resolution of the primary optical pickoff system, e.g. 2° in the above example.

Moreover, depending on the resolution of the linear detector array, the skewed line may overlie a number of detectors. The exact position of the line may be conventionally determined by averaging, or may be determined by identifying the outer detectors spanned by the line.

While as described, the subject magnification system is applied to digital encoding disks, it is possible to provide a gross angular position through the utilization of a primary slot located along the same radius as the secondary slot, and by providing the encoding disk with a primary spiral, such that the gross position of the encoder disk is determined by the position of the primary spiral within the primary slot, the fine angular position being determined as before by the position of the secondary line within the secondary slot.

The magnification afforded by the secondary optical pickoff system is such as to improve the accuracy of the angular pickoff of the encoder disk by as much as two orders of magnitude due to the increased distance of the secondary pickoff lines from the center of the disk vis a vis the marks for the primary system. The accuracy is also determined by the length of the secondary lines, with longer lengths providing higher accuracies. However, the longer the length of the secondary line, the slighter will be the skew angle and thus the more difficult will be the detection of the secondary line position within the slit.

BRIEF DESCRIPTION OF THE DRAWINGS

These and other features of the subject invention will be better understood in connection with the detailed description taken in connection with the drawings of which.

DETAILED DESCRIPTION

In order to augment the accuracy of a digital compass or a digital encoder disk, it has been found that an analog encoding system, when utilized in combination with a primary encoding system, increases the accuracy of detecting the angle of the encoder disk. In general, the analog portion of the system provides a secondary optical pickoff for the disk in which the secondary system is confined to the periphery or border of the disk containing the primary system. Because it is contained at a radial distance which is greater than that of the primary system, the degree of accuracy is magnified in that for a given angular displacement of the primary encoder disk, the result is greater lateral displacement for markings at greater distances from the center of rotation. This being the case, as much as two orders of magnitude improvement in determination of the angular position of the disk may be obtained through the utilization of a secondary pickoff system.

Figure 1:
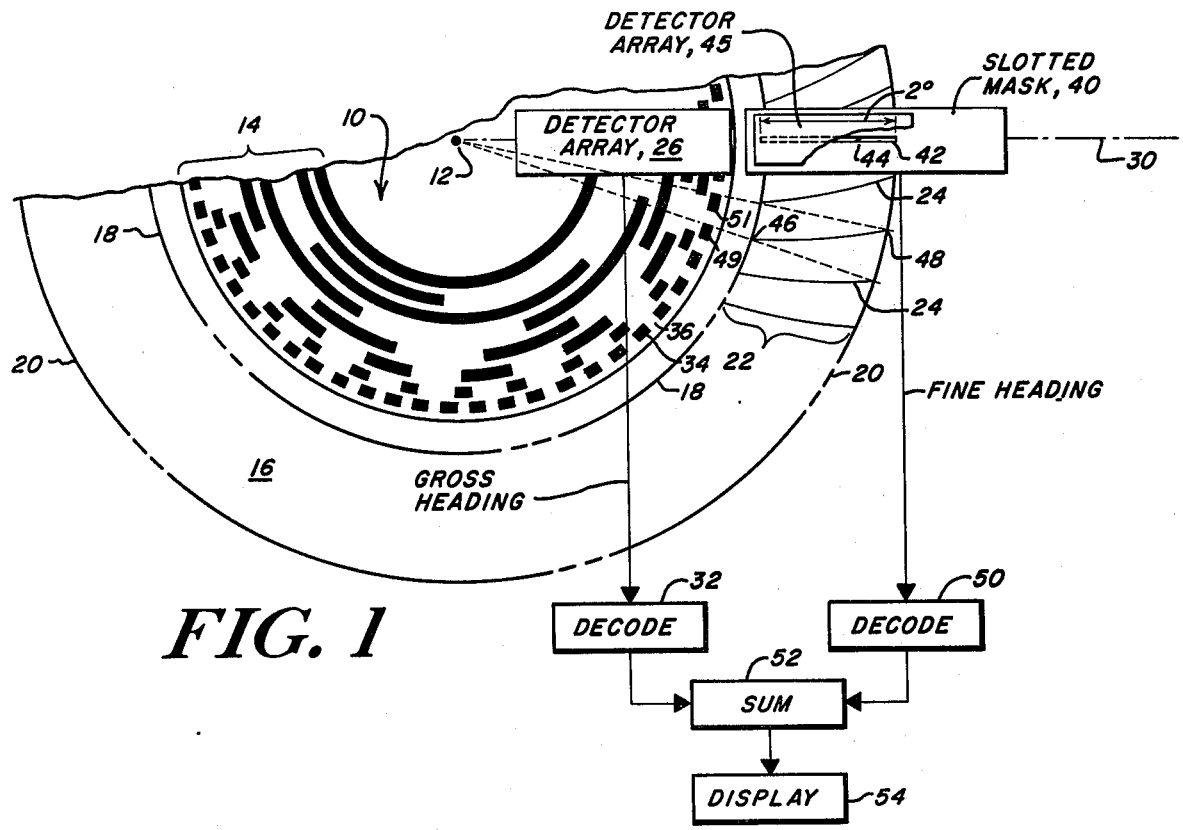
FIG. 1 is a schematic and diagrammatic illustration of the utilization of a secondary optical pickoff system in combination with a primary digital optical pickoff system.

Referring now to FIG. 1, an encoder disk 10 having a center of rotation at 12, is provided with digital encoding generally indicated at 14 that provides for a gross heading or gross determination of the angular position of the disk. The periphery or border of the disk 16 bounded by an inner circle 18 and an outer circle 20 contains an outer pattern 22 comprised of a plurality of skewed lines 24 which run at an angle to the radius of the disk.

As described in aforementioned U.S. Pat. No. 3,772,503, the inner pattern may be typically a Gray code, with the position of the disk being detected by a detector array 26 which detects the light transmissive and light opaque portions of the inner pattern in the manner described in the above patent. To this end, a light source is usually positioned to one side of the encoder disk whereas a detector array is positioned on the other side of the encoder disk, with the detector array lying along an axis 30 which is a predetermined radius of the disk. The pattern detected by the detector array is decoded conventionally at 32 and provides an output corresponding to the angular position of the disk good to an accuracy of, for instance, 2°. It will be appreciated that the accuracy of the Gray code or any digital encoding system is determined by that portion of the pattern which is responsible for the least significant bit. In this case, it is the dark and light areas 34 and 36 which are at the periphery of the inner pattern and determine the accuracy of the primary optical pickoff system.

In order to augment or in fact magnify the angular position of the disk, a slotted mask 40 is provided on one side of the disk with a slot 42 lying along axis 30. A linear detector array 44 is positioned over the slot such that the individual members of the linear array are exposed along the length of the slot. A light source (not shown in this figure) is located to the other side of the border of the disk such that the undersurface of the border of the disk is illuminated at least along line 30.

The slot or slit in mask 40 is narrow enough such that only a portion of one of the lines 24 will appear at the aperture defined by the slot. It is the position of this line, here illustrated at 44, within the slot aperture which provides for a fine determination of the angular position of the disk or, in terms of a compass card, a fine heading. It will be appreciated that as the angular displacement of the disk relative to the slot changes, the position of the line along the length of the slot changes, thereby to further define the angular orientation of the disk relative to axis 30 and the slot.

The degree of magnification depends, in part, upon the radial distance between inner circle 18 and outer circle 20, with the lines forming pattern 22 running between these two circles. The system is arranged such that one line and one line only appears in slot 42, with the angular displacement between an end 46 of one line and end 48 of this line corresponding to the angular error in the gross heading of gross reading of angular position corresponding to the spacing between the leading or trailing edges of adjacent least significant bit marks 49 and 51. In this way, one and only one line appears within the slit between the adjacent angular positions which are resolvable by the primary optical pickoff system. Note that any predetermined point on an outer mark may be used to determine the spacing between marks, with any offset between the primary pickoff and the secondary pickoff systems being readily corrected.

The output of detector array 45 is applied to a decode unit 50 which determines which of the detectors in the array is sensing line 44. Decode unit 50 determines which of the detectors is occluded by the line, along with the identity of this detector so as to determine how far up slot 42 line 44 appears. This determines an angle which is added to the gross heading angle at a summation unit 52, the output of which is displayed by conventional display 54.

It will be appreciated that the length of slot 42 and thus the radial distance between circles 18 and 20 determines to what extent the angular error of the primary pickoff system is divided up. In the aforementioned example, the position of line 44 within slot 42 is divided up into as many segments as there are detectors. Thus, if the slot length is equal to 2° and there are 200 detectors exposed to the slot, the angular position can be read to 1/100°. The resolution of this system is therefore dependent upon the number of detectors per linear inch, their resolution and this distance between the circles making up the border.

As mentioned hereinbefore, if the decoded angle is 70° and the line 44 exists a quarter of the way up slot 42, then assuming a 2° error in the primary reading, when these angles are added together the sum is 73.50° with the accuracy being as high as one one-hundredth of a degree. In order to provide for higher degrees of accuracy, a linear array having as many as one thousand detectors to the inch may be required.

Figure 2:
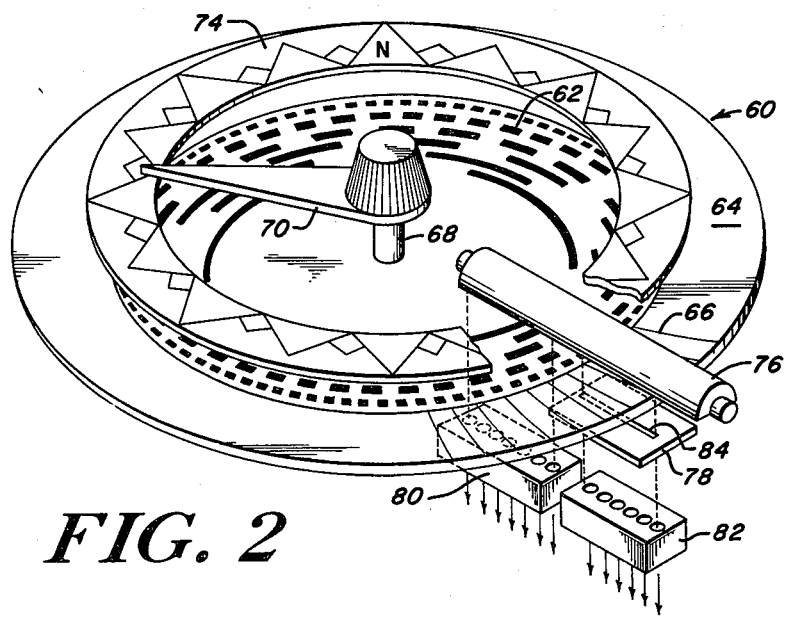
FIG. 2 is a diagrammatic illustration of the dual optical pickoff system of FIG. 1 illustrating the position of light source and detectors for utilization by the primary and secondary optical pickoff systems of FIG. 1.

Referring to FIG. 2, how this system is utilized with a compass card is illustrated. In this embodiment a disk 60 is provided with digital encoding 62 and a border 64 provided with pattern 66 as illustrated. Disk 60 is driven by a conventional magnet via a shaft 68 which has a pointer 70 attached thereto. Pointer 70 overlies a compass rose 74 for a visual pickoff of the compass direction. A light source 76 is positioned to one side of card 60 whereas a slotted mask 78 is positioned to the other side of the disk. A detector array 80 associated with the digital primary optical pickoff is positioned as illustrated, whereas a linear array 82 is positioned beneath slotted mask 78 to determine the position of one of lines 66 along slot 84 of the slotted mask.

Figure 3:
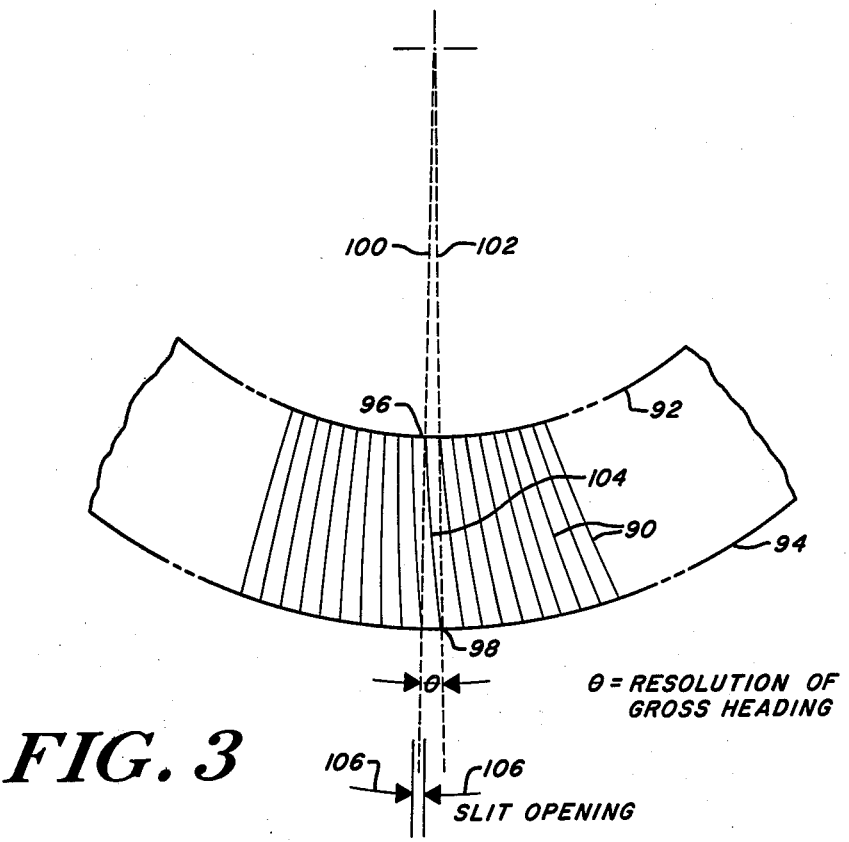
FIG. 3 is a diagrammatic illustration of the method of producing the pattern for the secondary optical pickoff system showing the running of a line from an inner circle to an outer circle at the periphery of an encoder disk.

Referring to FIG. 3, this diagram illustrates one method of generating the secondary optical pickoff pattern in which lines 90 run between an inner circle 92 and an outer circle 94.

Assuming that the gross resolution of the primary optical pickoff system is designated by $\theta$, then the lines utilized to further resolve the angular position of the disk start on the inner ring, for instance, at a position 96 and run to a position 98 which is angularly displaced by an amount $\theta$. Assuming that dotted line 100 represents the initial angular position, then dotted line 102 represents the angular displacement of the disk corresponding to the resolution of the primary optical pickoff system. The intersection of line 102 with circle 94 defines the position of point 98.

The pattern for the secondary optical pickoff system may merely be straight lines running from point 96 to point 98 about the periphery of the disk. However, the utilization of straight lines results in a non-linear correspondence between the position of the line exposed in the slit and angular position. This is undesirable in that it may require the special tailoring of the detector array. A linear relationship between angular displacement and position on the slit may be generated by providing that the line between point 96 and point 98 be curved such that a point 104 on the curve is at a distance $R = R_1 + K\theta$, where $R_1$ is the radius of circle 92. In this case, K is a constant which relates the scale of the outer pattern to angular position of the point in question.

Note that the lateral dimension of the slot defined by arrows 106 defines in part, the accuracy with which the secondary optical pickoff can be made. It will be appreciated that the narrower the slot, the more limited will be the aperture of the detectors, with this in combination with the line width of the outer pattern determining how many of the detectors in the array will be occluded for a given angular position by given width line in the pattern.

As mentioned before, should the line occlude a number of detectors, any suitable conventional averaging technique may be utilized to define that detector corresponding to the center of the line. This detector then defines the position of the line within the slit, which in turn determines the angular position of the disk. As will be discussed in connection with FIG. 6, this averaging technique may include the concept of determining the detectors which are not occluded and which bracket the occluded detectors. Having ascertained these detectors, it is the detector centered between these two non-occluded bracketing detectors which determines the position of the line within the slit.

Figure 4:
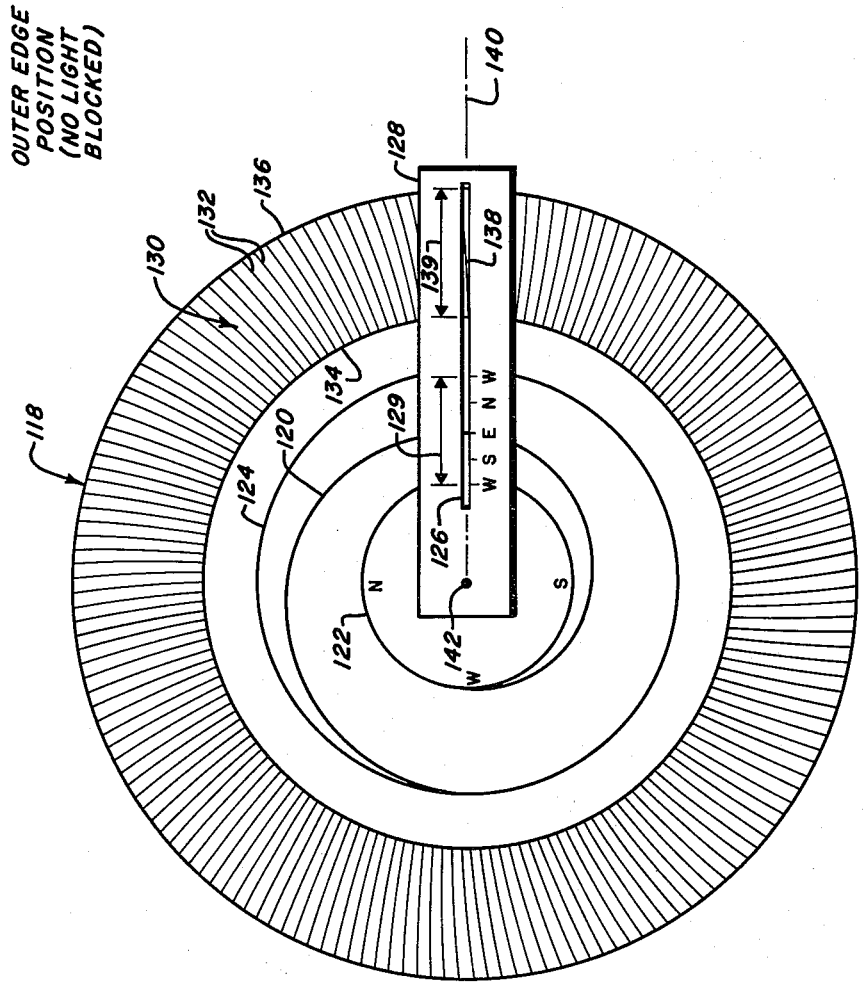
FIG. 4 is a top view of the combination of an optical encoder disk having an inner spiral for gross measurement and an outer pattern for fine measurements in which the same slit serves for determining the gross and fine positions of the encoder disk.

Referring now to FIG. 4, an analog primary optical pickoff system is represented by spiral 120 which runs between an inner circle 122 and an outer circle 124. The position of this spiral within slot 126 of mask 128 within the area designated by arrow 129 determines the gross reading of the angular position of disk 118. An outer pattern 130 comprised of lines 132 running from circle 134 to outer circle 136 defines the secondary optical pickoff system and is identical to that described hereinbefore. The position of line 138 within slot 126 within the area designated by arrow 139 defines the angular resolution of the combined system. Note that slot 126 lies on radius 140 from center 142 of disk 118.

Figure 5:
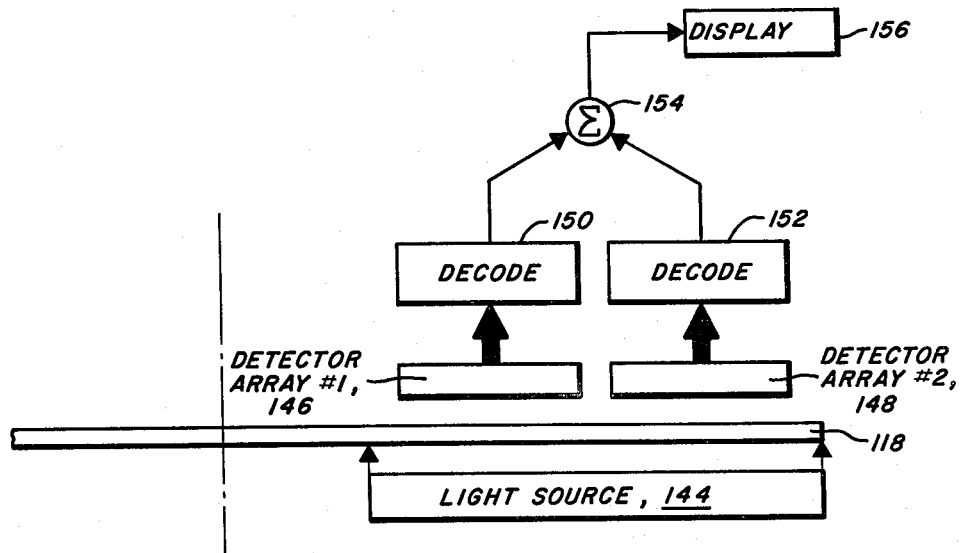
FIG. 5 is a schematic and block diagram of a decoder system for utilization with the encoder disk and slit of FIG. 4; and, FIG. 6 is a schematic and block diagram of an averaging circuit for the systems of FIGS. 1–5.

Referring to FIG. 5, disk 118 is as illustrated. A light source 144 is positioned to one side of disk 118, whereas detector arrays 146 and 148 are located to the other side of the disk and correspond in position to the primary and secondary optical pickoff patterns. The outputs of these detector arrays are coupled respectively to decode units 150 and 152, the outputs of which are summed at 154 and displayed at 156. The angular position decoded at decode unit 150 is added to the angular position decoded at decode unit 152 such that the overall degree of accuracy of the measurement of the angular position of the disk is greatly increased. It will be appreciated that the skewing of the lines of the secondary pattern are much less than the skewing of the line of the primary pattern, thus to magnify angular displacements of the disk. It will be appreciated that the slighter the skewing of a line relative to the radius, the more sensitive the position of the line within the slot is relative to the angular position of the disk. However, a single line in the outer pattern cannot determine completely the angular position of the disk without providing the angle of the disk at point 96. This is accomplished through the primary optical pickoff system.

Figure 6:
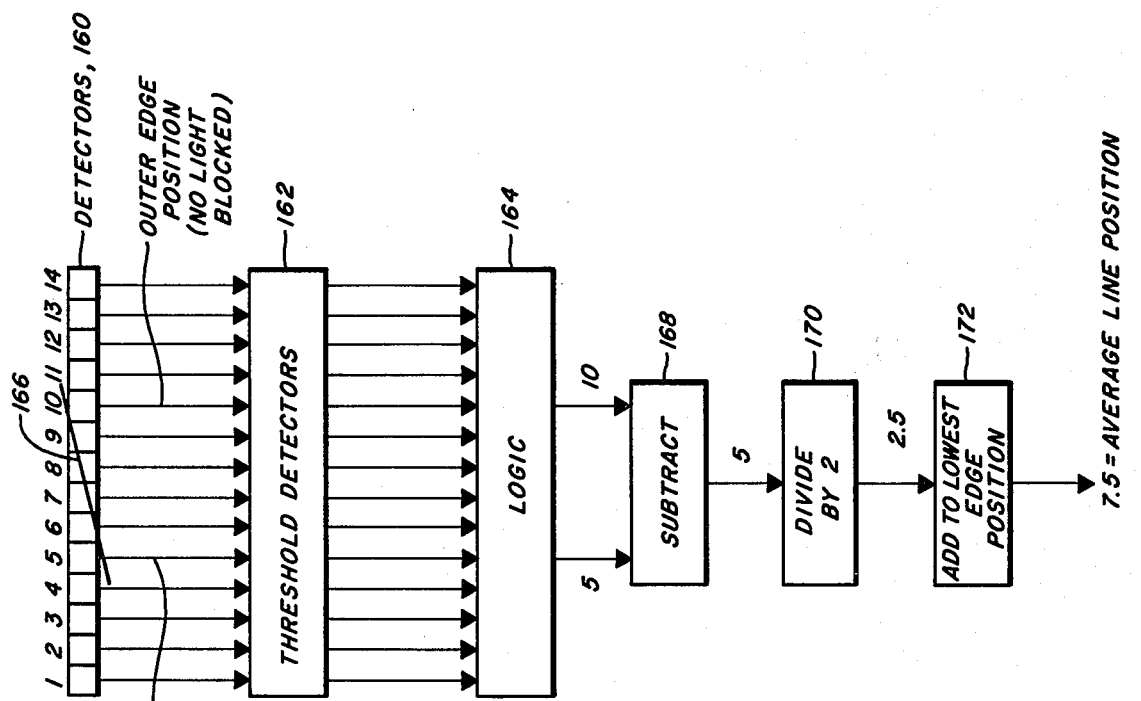

Referring now to FIG. 6, one method of averaging the outputs of a linear array of detectors when more than one detector is occluded is illustrated. In this example, a linear array of detectors 160 representing positions 1, 2, 3–14 have outputs coupled to a like number of threshold detectors 162, the outputs of which are applied to a logic unit 164 which determines the bracketing non-blocked or occluded outer edge position detectors. This can be seen as follows. Assuming a line 166 blocks or at least partially occludes the detectors at positions 6, 7, 8 and 9, this leaves the closest outer edge position detectors 5 and 10 unoccluded or non-blocked. Logic unit 164 determines that detectors 1, 2, 3, 4 and 5 are non-blocked and that detectors 10, 11, 12, 13 and 14 are non-blocked. It then determines for the first set the highest number and for the second set the lowest number. This would be 5 and 10. These numbers are applied to a subtraction unit 168 such that the result is 5. This is divided by two at unit 170 so as to yield the number 2.5. This number of 2.5 is added to the lowest edge position, e.g. 5 at unit 172 so as to determine that the average line position is at a position 7.5. This averaging technique may be utilized with respect to either the FIGS. 1 and 2 embodiments or the FIGS. 4 and 5 embodiments in terms of the decode units therefore.

What has therefore been provided is a system for augmenting the accuracy of a digitally encoded disk or, in fact, for improving the resolution of a completely analog primary optical pickoff system, through the utilization of a secondary pattern which results in an analog detection of the angular position of the disk in question.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A high resolution compass card position decoder comprising:
    a compass having a card mounted for rotation within said compass about an axis perpendicular to said card through the center of said card, said compass card having an inner digital encoding pattern and an outer peripheral pattern arranged with respect to the center of said card, said outer peripheral pattern including a series of lines each running at an angle to a radius of said card from an inner circular position to an outer circular position;
    means along a first predetermined card radius for decoding the angular position of said card from said digital encoding pattern so as to decode gross compass heading; and
    means along a second predetermined card radius for detecting the position along said second radius of one of said lines so as to decode fine compass heading.

2. The decoder of claim 1 and further including means for summing said gross and fine angular compass headings.

3. The decoder of claim 1 wherein said first and second predetermined radii are coincident.

4. The decoder of claim 1 wherein the starting points of adjacent lines are spaced-apart by the angular resolution of said digital encoding pattern and wherein the ending point of a line is angularly displaced from its starting point by said angular resolution.

5. The decoder of claim 4 wherein said lines are curved.

6. The decoder of claim 5 wherein said lines are such that a point on the curve is at a distance R from the center of said card equal to $R_1 + K\theta$ where $R_1$ is the radius of the inner circular position, $\theta$ is the position of the point and K is a constant.

7. The decoder of claim 1 wherein said line position detecting means includes a mask having a slot aligned with said second predetermined radius and located to one side of said card, and an array of detectors located adjacent said slot to the side of said mask removed from said card.

8. The decoder of claim 7 wherein said card is transparent either at said lines and opaque elsewhere, or is opaque at said lines and transparent elsewhere, and further including a light source to the other side of said card.

9. The decoder of claim 7 and further including means for determining the average position of said line when said line spans a number of the detectors in said array.

10. The decoder of claim 9 wherein said detectors have consecutive numbers associated therewith, and wherein said averaging means includes a plurality of threshold detectors, each associated with a different detector, means coupled to said threshold detectors for identifying the innermost detectors at which there is no indication of said line at a detector and for determining the numbers associated with said innermost detectors thereby to determine the outer edge positions spanned by said lines, means for subtracting the number associated with one of said innermost detectors from the number associated with the other of said innermost detectors and for dividing the result by two, and means for adding the result of the division to the number representing the lowest numbered innermost detector, thereby to determine the average line position.

11. Apparatus for determining the angular position of a shaft comprising:
    a disk mounted at its center to said shaft, said disk having an inner pattern including a single inner spiral running 360° from a first circular position to a second circular position, and an outer peripheral pattern including a series of lines each running at an angle to the radius of said disk from a third circular position to a fourth circular position;
    means along a first predetermined disk radius for detecting the position along said first radius of said single inner spiral so as to decode gross angular position; and
    means along a second predetermined disk radius for detecting the position along said second radius of one of said lines so as to decode fine angular position.

12. The apparatus of claim 11 and further including means for summing said gross and fine angular positions.

13. The apparatus of claim 11 wherein said first and second predetermined radii are coincident.

14. The apparatus of claim 11 wherein said line position detecting means includes a mask having a slot aligned with said second predetermined radius and located to one side of said disk, and an array of detectors located adjacent said slot to the side of said mask removed from said disk.

15. The apparatus of claim 14 wherein said disk is transparent either at said lines and opaque elsewhere, or is opaque at said lines and transparent elsewhere and further including a light source to the other side of said disk.

16. The apparatus of claim 14 and further including means for determining the average position of said line when said line spans a number of the detectors in said array.

17. The apparatus of claim 15 wherein said detectors have consecutive numbers associated therewith, and wherein said averaging means includes a plurality of threshold detectors, each associated with a different detector, means coupled to said threshold detectors for identifying the innermost detectors at which there is no indication of said line at a detector and for determining the numbers associated with said innermost detectors thereby to determine the outer edge positions spanned by said lines, means for subtracting the number associated with one of said innermost detectors from the number associated with the other of said innermost detectors and for dividing the result by two, and means for adding the result of the division to the number representing the lowest numbered innermost detector, thereby to determine the average line position.

18. The apparatus of claim 11 wherein said lines are curved.

19. The apparatus of claim 18 wherein said lines are such that a point on the curve is at a distance R from the center of said disk equal to $R_1 + K\theta$ where $R_1$ is the radius of the inner circle, $\theta$ is the position of the point and K is a constant.

20. Apparatus for detecting the angular position of a shaft comprising:
a disk mounted at is center to said shaft, said disk having an inner digital encoding pattern and an outer peripheral pattern, said outer peripheral pattern including a series of lines each running at an angle to a radius of said disk from an inner circular position to an outer circular position;
means along a first predetermined disk radius for decoding the angular position of said disk from said digital encoding pattern so as to decode gross angular position; and
means along a second predetermined disk radius for detecting the position along said second radius of one of said lines so as to decode fine angular position.

21. The apparatus of claim 20 and further including means for summing said gross and fine angular positions.

22. The apparatus of claim 20 wherein said first and second predetermined radii are coincident.

23. The apparatus of claim 20 wherein the starting points of adjacent lines are spaced-apart by the angular resolution of said digital encoding pattern and wherein the ending point of a line is angularly displaced from its starting point by said angular resolution.

24. The apparatus of claim 23 wherein said lines are curved.

25. The apparatus of claim 24 wherein said lines are such that a point on the curve is at a distance R from the center of said disk equal to $R_1 + K\theta$ where $R_1$ is the radius of the inner circle, $\theta$ is the position of the point and K is a constant.

26. The apparatus of claim 20 wherein said line position detecting means includes a mask having a slot aligned with said second predetermined radius and located to one side of said disk, and an array of detectors located adjacent said slot to the side of said mask removed from said disk.

27. The apparatus of claim 26 wherein said disk is transparent either at said lines and opaque elsewhere, or is opaque at said lines and transparent elsewhere, and further including a light source to the other side of said disk.

28. The apparatus of claim 26 and further including means for determining the average position of said line when said line spans a number of the detectors in said array.

29. The apparatus of claim 28 wherein said detectors have consecutive numbers associated therewith, and wherein said averaging means includes a plurality of threshold detectors, each associated with a different detector, means coupled to said threshold detectors for identifying the innermost detectors at which there is no indication of said line at a detector and for determining the numbers associated with said innermost detectors thereby to determine the outer edge positions spanned by said lines, means for subtracting the number associated with one of said innermost detectors from the number associated with the other of said innermost detectors and for dividing the result by two, and means for adding the result of the division to the number representing the lowest numbered innermost detector, thereby to determine the average line position.

* * * * *